Nov. 8, 1932.  E. B. COLLINGE  1,887,118

COMBINATION TRAILER AND SEMITRAILER

Filed Dec. 3, 1928  6 Sheets-Sheet 1

Inventor
EDWARD B. COLLINGE

By  *(signature)*
Attorney

Nov. 8, 1932.     E. B. COLLINGE     1,887,118

COMBINATION TRAILER AND SEMITRAILER

Filed Dec. 3, 1928     6 Sheets-Sheet 2

Inventor
EDWARD B. COLLINGE
By
Attorney

Patented Nov. 8, 1932

1,887,118

UNITED STATES PATENT OFFICE

EDWARD B. COLLINGE, OF LOS ANGELES, CALIFORNIA

COMBINATION TRAILER AND SEMITRAILER

Application filed December 3, 1928. Serial No. 323,503.

This invention relates to an organization or vehicle which is designed for the purpose of transporting heavy loads, and is more particularly confined to a vehicle which embodies a truck or tractor used in combination with a so-called semi-trailer.

A semi-trailer as herein designated refers to a trailer adapted to be used in combination with a motor truck or tractor, the forward end of the trailer being supported directly upon the rear end of the tractor; and from the definition of the invention as a combination semi-trailer and trailer it is to be inferred that this invention relates to an organization which may be employed with equal facility as a semi-trailer wherein the front end of the trailer is supported by the rear end of the truck or as a trailer which is independently supported by a set of front and rear wheels drawn by means of a truck through the medium of a suitable connection such as a tongue.

It is a well known fact that there are at this time various so-called semi-trailer organizations which are in commercial use and, although these organizations have met with a limited amount of success, they are handicapped by certain undesirable features which it is an object of this invention to eliminate.

Trailers of the class described which are now in common use embody a truck or tractor member, the rear end of which carries a turntable having downwardly extending inclined planes, and the semi-trailer member embodies an organization having a set of small auxiliary front wheels which are adapted to be raised out of engagement with the ground and which support the forward end of a frame. The frame in turn is provided with a set of rollers adapted to ride upon the mentioned downwardly extending inclined plane or planes on the rear end of the truck and, by the rearward movement of this plane beneath the mentioned rollers, the front end of the semi-trailer is adapted to be lifted to a position at which its weight is carried by the rear end of the tractor.

In assembling organizations of this character it is necessary to block the semi-trailer in some suitable manner and to back the tractor beneath the rollers with sufficient force to elevate the front end of the trailer. It will be apparent in such an organization that the weight which the trailer is permitted to carry is limited by the friction with which the wheels of the tractor will engage the surface upon which they are resting. In other words, if the trailer has sufficient weight the rear or driving wheels of the tractor will tend to spin instead of backing in under the front end of the trailer as described.

Semi-trailer organizations now in use have a further undesirable feature in that it is necessary to have the tractor and the trailer in exact alignment before they can be properly assembled.

It is a well known fact among those familiar with the art that the load which a truck or a truck and trailer organization is permitted to carry is restricted by the area of the tire surface which is on contact with road or pavement, and in semi-trailer organizations such as are now in use, in which the front end of the trailer is carried by a set of small auxiliary wheels, it is impossible to use a trailer of this character independently supported for the transportation of heavy loads as would be necessary in using the trailer not as a "semi" but as a self-supporting unit.

A still further disadvantage in semi-trailer organizations such as are in common use resides in the manner in which these trailers are locked to the tractor member, in as much as these organizations are so constructed that any dislodgement or disengagement of the locks which may be incurred through a sudden jolt or a twisting action between the tractor and the trailer will result in setting the trailer free, making the organization dangerous for use over rough or uneven roadways.

A primary object of this invention is the production of a tractor and semi-trailer organization in which the front wheels of the trailer are standard tired wheels and in which the relative movement between the tractor and the trailer is effected by a positively driven power organization supported upon the rear end of the tractor.

The front wheels of the trailer are so constructed within the trailer frame that they are movable relative to the rear wheels and may during the advance of the trailer upon the tractor, be retracted to a position in which they are supported by a pivoted member which admits the movement of the wheels in a vertical plane.

It is a further object of the invention to provide the trailer with guide means whereby the movement of the front wheels of the trailer in a horizontal plane is prevented while the front wheels are in a retracted position but which is so formed as to admit the angular or pivotal movement of the mentioned front wheels when they are in a forward position.

It is a still further object of the invention to provide a trailer of the class described with locking means adapted to co-operate with suitably formed guide means for the purpose of holding the front wheels in a forward position or, when the trailer is mounted upon the truck, to hold the front wheels of the trailer in a retracted position.

It is a further object of the invention to develop locking means of this character which are adapted for the dual purpose of locking the trailer upon the tractor and locking the front wheels of the trailer in the two positions above described.

It frequently happens, in the use of semi-trailers and tractor organizations of the character described, that it is inconvenient or impossible to align the tractor perfectly with the trailer and it also happens frequently that the front wheels of the trailer are at a different level from the rear wheels of the tractor, making it inconvenient and sometimes impossible for the front end of the trailer to be engaged by the lifting organization upon the rear end of the tractor.

It is therefore a still further object of this invention to develop an organization of the class described in which the power driven trailer advancing organization may be angularly adjusted to receive the front end of the trailer from various positions and, in order to facilitate the reception of the front end of the trailer by the trailer advancing organization, the forward end of the trailer is provided with flared sections which engage the power driven advancing means as will be hereinafter described. To facilitate the placement of the trailer upon the tractor, when the front end of the trailer is supported at a different elevation from the rear end of the tractor, the power driven advancing means are provided with a vertical adjustment by means of which such means are raised or lowered to accommodate the position of the front end of the trailer frame.

A still further object of this invention is to provide a semi-trailer of the class described with a positive connection in the form of a tongue interposed between the front wheels of the trailer and the rear end of the truck which acts as a safety against the disengagement and consequent removal of the trailer and at the same time provides means whereby the trailer may be drawn independently as a self-supporting organization. It will be apparent that, through the improvements enumerated above in the objects of this invention, this invention embodies a tractor and trailer organization which may be constructed to carry any weight permissible by the tire surface area resting upon the pavement. The power driven assembling unit obviates the limitation placed upon an ordinary semi-trailer due to the inclined plane construction, and it is possible through the use of a six-wheel tractor and a six-wheel trailer to carry, by means of a single unit, loads which are far in excess of any that may now be carried by either a tractor or by a tractor and trailer assembly, since such an organization provides a unit having ten supporting wheels upon the roadway.

By using standard truck or trailer wheels for the support of the front end of the trailer unit, it will be understood that this unit may be used as a trailer upon the highway with any standard truck or tractor which is a feature of primary importance of this invention over semi-trailer units such as are now in common use. It will be understood, of course, that if the unit is to be used as a semi-trailer, the truck or tractor must have the advancing mechanism mounted thereon. The advancing mechanism is arranged and adapted to be mounted on any standard truck.

The details in the construction of this invention, and further objects attending its production, will be better understood from the following description of the accompanying drawings which are chosen for illustrative purposes only and in which.

More particularly describing the invention as herein illustrated, reference numeral 11 indicates a truck or tractor member and reference numeral 12 indicates a trailer member. The truck or tractor member 11 embodies a body 13 including a frame section 14, front wheels 15 and rear wheels 16.

The trailer member 12 comprises a trailer frame 17, front wheels 18 and rear wheels 19. It will be noted from the two positions of the front wheels shown in Figs. 1 and 2 that they are movable relative to the rear wheels; and, from the dotted line position shown in Fig. 2, it will also be noted that, when the front wheels are in the retracted position, they are also movable in vertical planes relative to the rear wheels.

Figure 13:
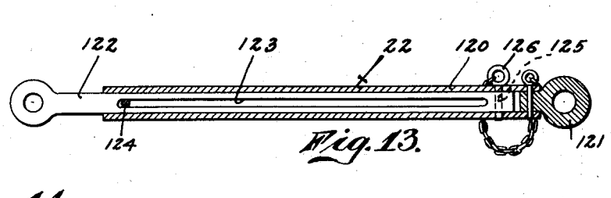
Fig. 13 is an enlarged elevational view partly in section illustrating a form of telescoping tongue such as may be used in connecting the front wheel frame of the trailer with the rear end of the tractor.

The construction by means of which both of the above mentioned movements are obtained will be hereinafter described. It will be sufficient to say at this time that the front wheels 18, which are suspended from a front wheel supporting frame 21, are connected through the supporting frame with the rear end of the tractor by means of a tongue and that, when the trailer member 12 is being assembled upon the tractor member 11, the tongue 22 (being of a telescopic nature as indicated in Fig. 13) is placed in the position shown in Fig. 2, and while in such position holds the front wheels of the trailer in a substantially fixed position relative to the rear end of the tractor, thereby permitting a relative advance of the rear wheels 19 of the trailer toward the front wheels 18.

Figure 3:
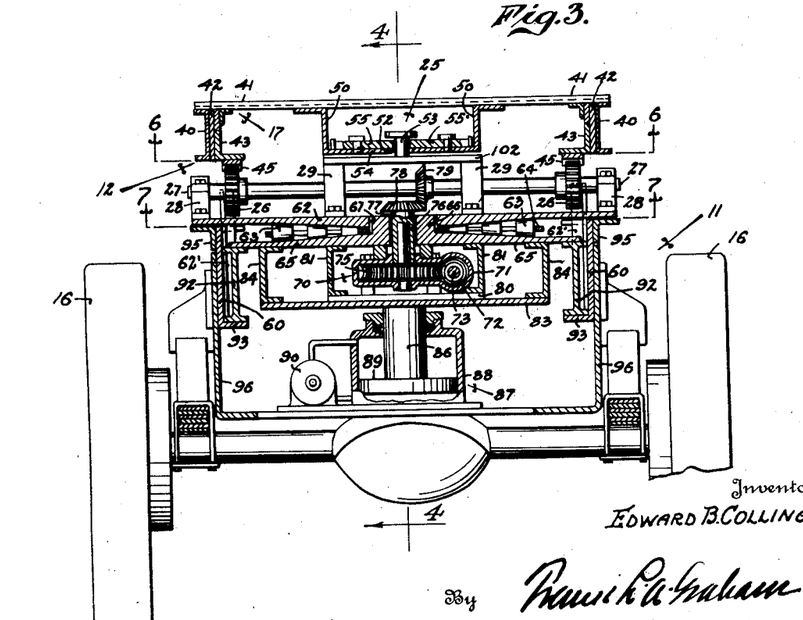
Fig. 3 is an enlarged sectional elevation taken substantially in a plane represented by the line 3—3 in Fig. 2 and showing the details in the construction of the power driven trailer advancing means, together with the vertical adjustment therefor.

The power driven unit which has heretofore been mentioned as being carried by the rear end of the tractor 11 is indicated by reference numeral 25 and is best illustrated in Fig. 3. This unit embodies a pair of oppositely disposed gears 26 which are carried by a suitable shaft 27 supported in bearings indicated at 28 and 29. The forward end of the trailer is provided with upwardly tapered racks indicated at 30 which are adapted to engage the gears 26 on the power unit 25.

Figure 2:
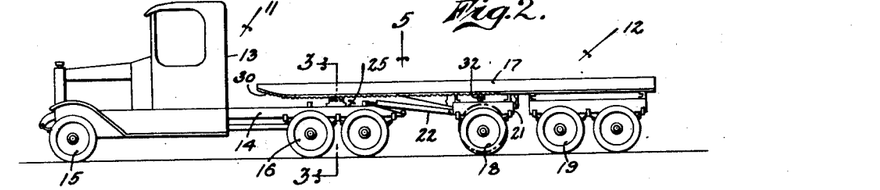
Fig. 2 is an elevational view similar to Fig. 1 but shows the semi-trailer mounted upon the rear end of the tractor and the front wheels in a retracted position.

It will be apparent that the relative movement effected between the tractor and the trailer by means of the power unit will, through the tapered construction of the forward end of the racks, be effective to elevate the front end of the trailer to the position shown in Fig. 2.

Figure 1:
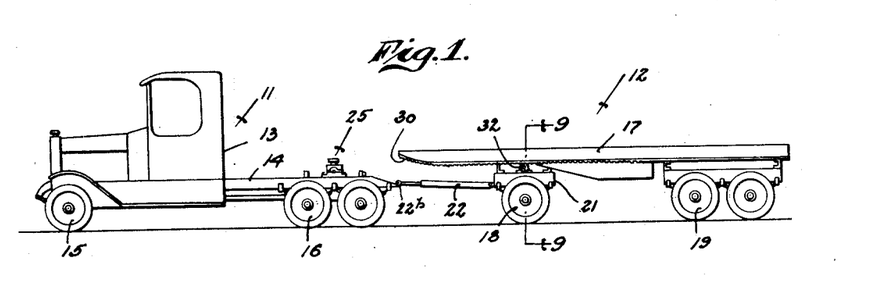
Fig. 1 illustrates a tractor and trailer assembly of the class described showing the trailer connected to the tractor as an independent or self-supporting trailer.
Figure 4:
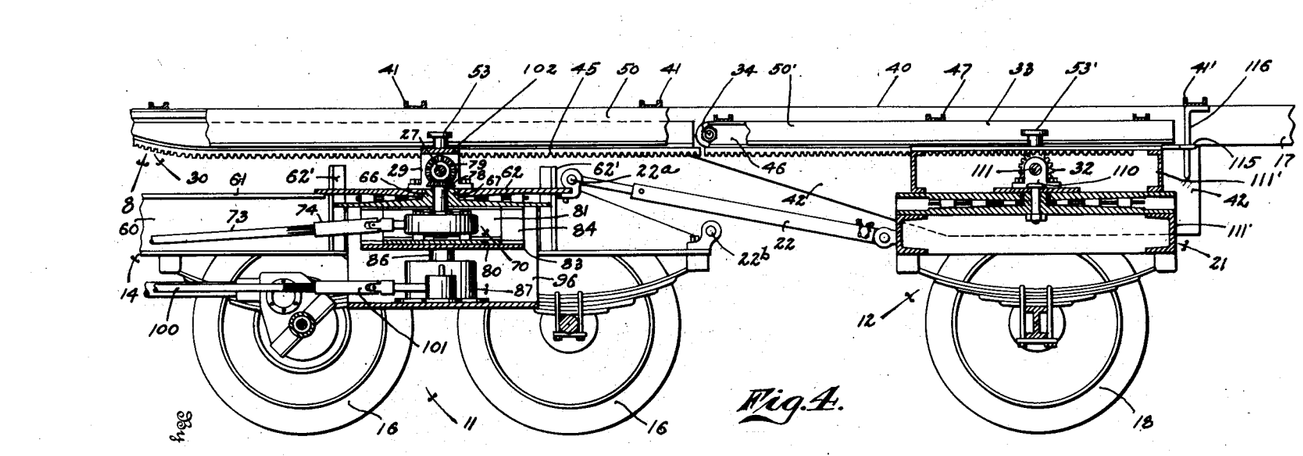
Fig. 4 is an enlarged elevational section which may be considered as having been taken substantially in a plane represented by the line 4—4 in Fig. 3 and illustrates the central portion of the assembled unit as shown in Fig. 2.

It will also be noted in Figs. 1 and 2, and is more clearly illustrated in Fig. 4, that the rack members on the trailer extend rearwardly a substantial distance, and the front wheel supporting frame 21 is provided with a pair of oppositely disposed gears 32 which engage this frame during the retraction of the front wheels and that the rear section of this trailer supported rack, indicated by reference numeral 33 in Fig. 4, is pivoted to the main trailer frame at 34, thus permitting the vertical movement of the front wheels when in a retracted position as was heretofore mentioned.

The details in the construction of the power unit and the tractor and semi-trailer assembly are best illustrated in Figs. 3 to 11, inclusive, wherein the trailer frame 17 is illustrated as embodying a pair of oppositely disposed channels indicated at 40 which are connected in any suitable manner such as by means of transverse channels indicated at 41.

A pair of oppositely disposed guide plates, indicated at 42, are attached to the inner surface of channels 40, and the purpose of these guide plates, as has been heretofore suggested and will be hereinafter explained, is to hold the front wheel supporting frame 21 in substantially parallel relation with the rear wheels when this frame is in a retracted position.

Figure 16:
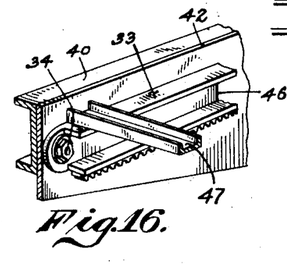
Fig. 16 is an enlarged perspective view showing the manner in which the front wheel supporting rack in the trailer is constructed relative to the trailer frame and the front wheel guide plates.

The rack members generally indicated in Figs. 1 and 2 by reference numeral 30 embody oppositely disposed angles 43, the forward sections of which are rigidly attached to the inner faces of the channels 40 or the plate members 42, the lower edges thereof being provided with the racks indicated at 45. As was previously mentioned, the rear section of the rack members 30 are separate from the forward section pivotally connected with the side channels 40. These members may be in the form of channels as indicated at 46 in Fig. 16 and are provided with transverse interconnecting channels indicated by reference numeral 47.

A pair of Z-shaped frames, indicated by reference numeral 50, are mounted upon the lower surfaces of the transverse members 41 and co-operate with similar frames 50' mounted upon the lower surfaces of the transverse members 47 to provide a guide passage 52 which is adapted to receive locking pins 53 and 53' mounted upon the rear end of the tractor and the trailer front wheel supporting frame, respectively, as will be hereinafter described.

Figure 8:
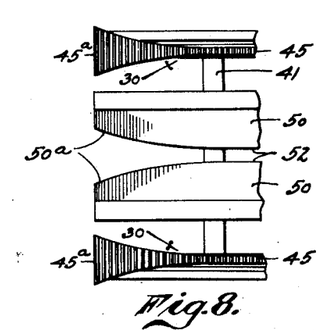
Fig. 8 is an inverted plan view illustrating the forward end of the trailer and may be considered as having been taken in the direction of the arrow 8 in Fig. 4.
Figure 14:
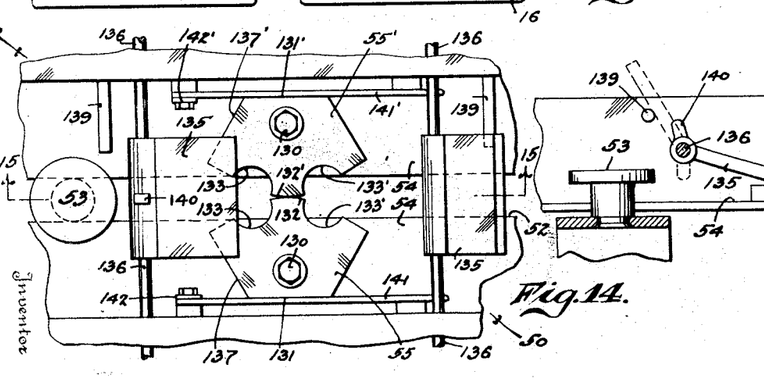
Fig. 14 is an enlarged plan view illustrating the details of a locking organization used in combination with this invention.
Figure 15:
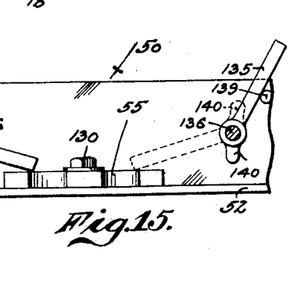
Fig. 15 is a sectional elevation which may be considered as having been taken substantially in a plane represented by the line 15—15 in Fig. 14.

As is illustrated in Fig. 8, the forward ends 45a of the rack members 45 are outwardly flared to more readily admit the reception of the gears 26 and it will also be noted that the forward ends 50a of the Z-members 50 are flared outwardly to co-operatively aid in the reception of the pin 53. The bottom sections 54 of the Z-members 50, which define the passage 52 therebetween, are upwardly provided with locking plates indicated at 55 and 55' which are adapted to engage and retain the pins 53 and 53' when the members 53 and 53' have reached the relative positions indicated in Fig. 5. The construction and operation of these locking plates is best illustrated in Figs. 14 and 15 and will be hereinafter described in detail.

The frame section 14 of the tractor unit 11 embodies oppositely disposed channel members 60. A portion of the upper flange 61 of these channels is removed for the purpose of admitting vertical guide angles 62' as is best illustrated in Fig. 4.

Figures 6, 9:
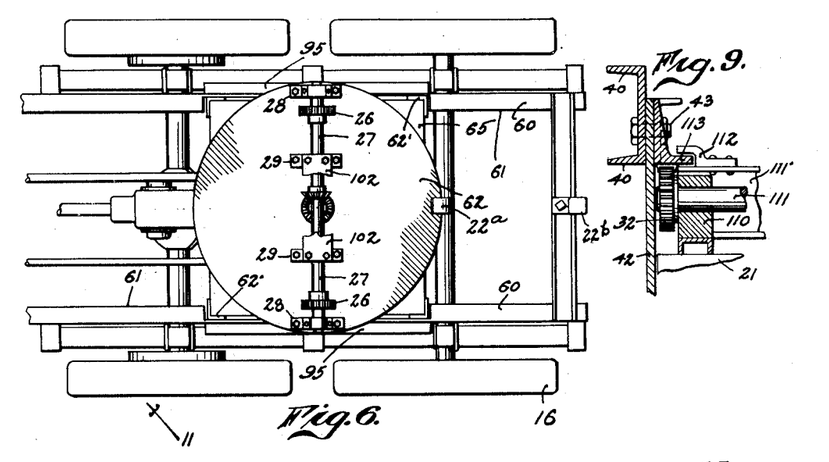
Fig. 6 is an enlarged plan view showing the power driven trailer advancing organization and may be considered as having been taken substantially in a plane represented by the line 6—6 in Fig. 3.
Fig. 9 is a partial elevational section illustrating the manner in which the trailer front wheel frame is mounted within the trailer frame. This view is taken substantially in a plane represented by the line 9—9 in Fig. 1.

The power driving organization 25 is mounted between these guides angles, as illustrated in Figs. 3, 4 and 6, and embodies as heretofore indicated the shaft 27 which carries the gears 26 and is supported in bearings 28 and 29.

The bearings 28 and 29 are mounted upon what may be termed a rotating table indicated at 62. This table is supported through the medium of a plurality of rollers 63 retained within a roller plate 64 upon a substantially square bearing plate 65. It will be noted that the bearing plate 65 has a central aperture hub 66 which extends upwardly through a corresponding aperture 65 in the turntable or rotary plate 62.

Mounted below the bearing plate 65, and in fixed relation therewith, is a worm unit generally indicated by reference numeral 70. This unit embodies a housing 71 containing a worm 72 adapted to receive rotation through a shaft 73 with which it is connected by means of a spline and swivel joint 74.

It will be understood that the shaft 73 is adapted to receive rotation from the power unit of the truck, being connected to the transmission in any conventional manner well known to those familiar with the art. The worm 72 is adapted to drive a worm wheel 75 within which a substantially square or polygonal shaft 76 is rigidly mounted.

Figure 11:
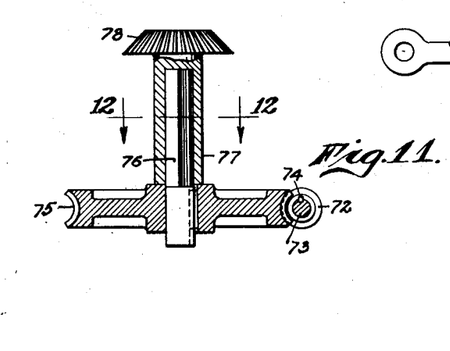
Fig. 11 is an enlarged sectional view illustrating the construction of a preferred form of driving worm and driving pinion such as is employed in the power advancing organization used in my invention.
Figure 12:
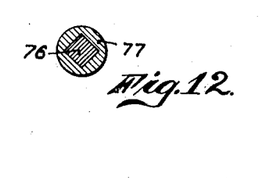
Fig. 12 is a sectional plan view taken substantially in a plane represented by the line 12—12 in Fig. 11.

The shaft 76 extends upwardly in coaxial relation with the hub 66 in the bearing plate 65 and is adapted to receive a vertical drive shaft 77, the lower end of which is in the form of a sleeve having a polygonal recess therein which co-operates with the vertical shaft 76 to receive a positive driving movement from the worm wheel 75. This construction is best illustrated in Fig. 11 where it will be noted that the upper end of the vertical shaft 77 is provided with a bevel gear 78; and, returning to Fig. 3, the bevel gear 78 is adapted to engage a corresponding bevel gear 79 mounted upon the transverse power shaft 27.

It will be understood from this construction that the power unit of the truck, operating through the shaft 73 and the spline coupling 74, drives the worm wheel 75 and thereby is effective to rotate the shaft 27 which, when the racks 45 are in engagement with the gears 26, results in a relative movement between the trailer 17 and the tractor member 11.

In order that there may be no crushing action or excessive pressure upon the worm housing 71, this housing is interposed between a housing bearing plate 80 which is spaced below the square bearing plate 65 by means such as channels indicated at 81. The bearing plate 80 in turn rests upon a bottom bearing plate 83 which is also spaced below the upper bearing plate 65 by means of channels 84.

The bottom bearing plate 83, in the form of the invention illustrated in Fig. 4, rests upon the upper end of a plunger 86 embodied in a hydraulic hoist generally indicated by reference numeral 87. It will be understood that this hoist may be of any preferred construction and is illustrated as comprising a housing 88, a piston 89, the plunger 86 and a pump 90 adapted to circulate fluid from the upper part of the housing to the lower part thereof, and to effect thereby a vertical adjustment of the power unit 25.

It will be understood that this vertical adjustment, which is effected by means of the hoist, is used only in obtaining the correct position of the gears 26 relative to the rack members 30 during the assembly of the unit and that, when the semi-trailer and tractor are being used for the purpose of transmitting loads, the organization is lowered to the position shown in Fig. 3 wherein it will be noted that I-beams 92 are provided upon the upper surfaces of the lower flanges 93 of the channels 60 and are so positioned as to support the outer edges of the bearing plates 65 when the organization is in lowered position.

As a further precaution against rupture of the unit through twisting due to uneven roads, etc., the rotary plate or upper turn table 62 is so positioned relative to the bearing plate 65 that there is a very slight clearance of, say, one-sixteenth of an inch between the outer edge of the rotary plate 62 and the upper edge of the channels 60; and to increase the strength of the unit and the supporting surface at this point, the outer surface of the channels 60 are provided with angles indicated by reference numeral 95.

Figure 10:
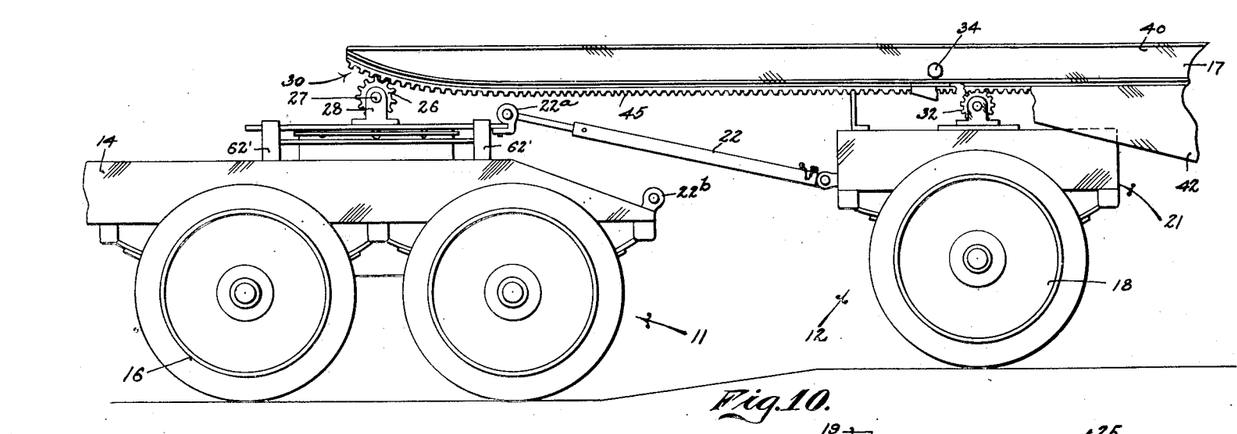
Fig. 10 is an elevational view showing the rear end of the tractor and the forward end of the trailer in position prior to the advance of the trailer over the rear end of the tractor and illustrates the manner in which the power driven trailer advancing organization may be adjusted in a vertical plane to accommodate the trailer when it is supported in a different plane from the tractor.

The hydraulic hoist 87 is supported by means of a U-shaped plate 96, the opposite edges of which are attached to the channel members 60 in any suitable manner. As was heretofore suggested, and as is best illustrated in Fig. 7, the square bearing plate 65 has its corners retained by the guide angles 62', and from this construction it will be understood that the bearing plate may be elevated by means of the hydraulic hoist to a substantial distance above the tractor frames as indicated in Fig. 10.

Figure 7:
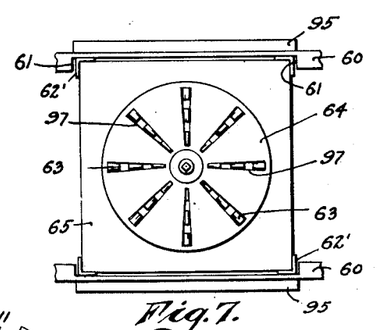
Fig. 7 is a partial plan section taken substantially in a plane represented by the line 7—7 in Fig. 3 and illustrates the details in the construction of the trailer supporting organization showing the means for supporting a rotary table and the means for operating the power driven trailer advancing member.
Figure 17:
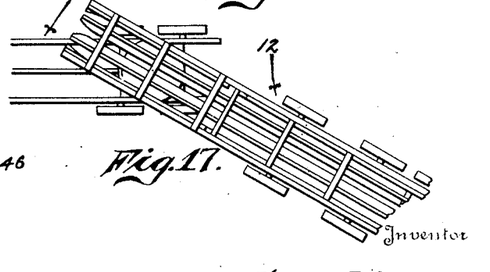
Fig. 17 is a diagrammatic plan view illustrating the manner in which the trailer advancing organization may be angularly adjusted to accommodate the trailer when the trailer and tractor are in angular relation with each other.

Fig. 7 also illustrates a preferred manner of supporting the rotary plate upon the square bearing plate and shows the intermediate plate 64 which is provided with a plurality of segmental apertures 97 adapted to receive the rollers 63. This structure permits the rotary table bearing the shaft 27 and the gears 26 to be adjusted at various angles relative to the position of the tractor. In view of the fact that the trailer is drawn upon the tractor by means of a power unit, the tractor and semi-trailer may be assembled when in angularly disposed positions relative to each other as shown in Fig. 17.

The hydraulic hoist 87 may be operated in any preferred manner such as by means of a motor. A preferred manner of operating the hoist is, however, through a transmission driven shaft 100 connected to the pump through a spline and swivel coupling 101.

The locking pin 53, which is carried upon the rear end of the tractor 14, may be attached thereto in any preferred manner but is illustrated as being mounted upon a plate 102 which is attached to the upper surfaces of the bearing members 29.

It has been previously mentioned that the front wheel frame supporting structure is provided with gears 32 and the manner in which these gears are supported upon the frame and co-operate with the rack members 30 and 33 is perhaps best illustrated in Figs. 4 and 9 wherein it will be noted that the front wheel supporting frame is provided with oppositely disposed bearings 110 adapted to receive a shaft 111 upon which the gears 32 are keyed. The front wheel frame 21 includes oppositely disposed supporting channels 111', the upper outer edges of which are provided with oppositely disposed guide channels 112 adapted to receive co-operatively formed flanges 113 which are best illustrated in Fig. 9 as being provided upon the inner edge of the rack supporting channels or angles 43 and 46, respectively.

In order that the pivoted rack sections 33 may be held against an oscillating movement in a horizontal plane, the rear ends of these members are provided with eye members or loops indicated at 115 which are adapted to be received by guide rods 116 supported upon a transverse channel 41' in the trailer frame.

The tongue 22, by means of which the trailer is connected with the tractor, is perhaps best illustrated in Fig. 13 wherein it will be noted that this member is of a telescoping nature embodying a sleeve 120 which is keyed to an I-section 121 and which slidably receives the forward or plunger section of the tongue 122.

The plunger section is provided with a slot 123 through which a fixed pin 124 in the forward end of the sleeve extends and the rear end of the plunger and the rear end of the sleeve are provided with co-operating apertures indicated at 125 which are adapted to receive a locking pin 126. This structure admits the use of the same unit for connecting the trailer with the tractor when the same is in the assembled relation shown in Fig. 1, the trailer being drawn independently or when in the position of a unit shown in Fig. 2 in which the trailer is supported as a semi-trailer.

It will be noted in Figs. 1 and 2 and in Figs. 4 and 10 that the front end of the tongue 22 is attached to the rear end of the turn table 62, as indicated at 22a, when the trailer is being used as a "semi" and is connected directly to the truck frame at 22b when the trailer is being drawn independently.

Figure 5:
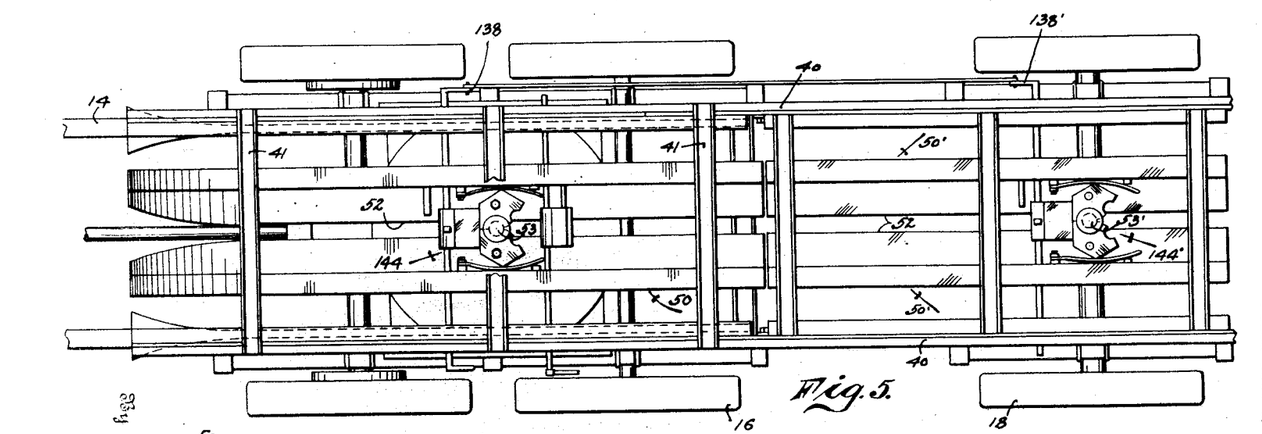
Fig. 5 is an enlarged plan view illustrating the manner in which the forward end of the trailer is mounted upon the rear end of the tractor and may be considered as having been taken substantially in the direction of the arrow 5 in Fig. 2.

The locking units embodying engagement plates 55, which are adapted to retain the pins 53 and 53' in the relative positions shown in Figs. 4 and 5, are perhaps best illustrated in Fig. 5, the details of the construction being more clearly shown in Figs. 14 and 15. In the last two mentioned figures it will be noted that the locking plates 55 and 55' are pivotally mounted upon the upper surfaces of the lower sections 54 of the Z-frames 50 by means such as bolts 130. The plates 55 and 55' are designed more or less in the form of circular segments in which the outer angles have been cut off, leaving flat surfaces 131 and 131'. The curved surfaces of these segments, indicated at 132 and 132', are provided with oppositely disposed and similarly formed notches indicated at 133 and 133'.

It will be noted from the illustration of the invention shown in Fig. 5 that, when a pin 53 moves into engagement with the oppositely disposed notches 133, the engagement plates 55 are rotated to a position at which the pin is enclosed within a circular sleeve or aperture formed by two oppositely positioned notches in the two plates and, in order that the pin may be retained in such position, a locking plate indicated by reference numeral 135 is illustrated as being mounted upon a rotatable shaft 136 which is supported transversely across the Z-frames 50. These plates are so disposed as to drop into engagement with the outer edges 137 and 137' of the pivoted engaging plates when the engaging plates are in the position shown in Fig. 5.

It will be understood that, when the plates 55 are in locked position relative to a pin 53, it is necessary, in order to withdraw the pin, to rotate the locking plate 135 to a position of disengagement with the two engaging plates. This rotation is effected by means such as a handle 138.

A supporting bar 139 is provided between the Z-frames to receive the locking plates 135 when in a disengaged position as indicated in the dot and dash line position on the left and full position on the right shown in Fig. 15 wherein it will be noted that the locking plates are also provided with an angularly extending lug 140 which is adapted to be engaged by the pin 53 during its withdrawal from the engaging plates 55 and by such engagement the locking plate is returned to the position shown in full lines in Fig. 15 where it will be moved by gravity to a locking position upon the "inward" movement of the engaging plates by the reception of the pin 53.

In order that the engaging plates may be yieldably held toward a neutral position such as is shown in Fig. 15, the outer edges 131 and 131' of these plates are engaged by resilient members such as the steel springs 141 and 141'. These springs may be supported upon the inner surface of the Z-frames in any suitable manner such as the bolt and collar construction generally indicated at 142 and 142'.

It will be noted in Fig. 5 that the trailer is provided with a locking unit 144 and a similar unit 144' upon the forward and intermediate section of the trailer frame, respectively; and it will also be apparent that, by providing the notches 133 and 133' on opposite sides of the point of tangency between the two plates 55 and 55', each of these units may be employed in locking the pins advancing toward the same from either direction. In other words, the unit 144 may be used to lock the trailer member upon the rear end of the tractor or to lock the front wheels of the trailer in the forward position shown in Fig. 1. The locking plate operating handle indicated at 138 may be connected with a similarly formed handle 138' adapted to co-operate with the rear locking organization 144'. The rear lock 144' is a safety feature in this invention and may be considered as being optional when the tongue 22 is used to connect the tractor and trailer. This construction admits the disengagement of both the front wheel lock and the tractor lock simultaneously.

Figure 18:
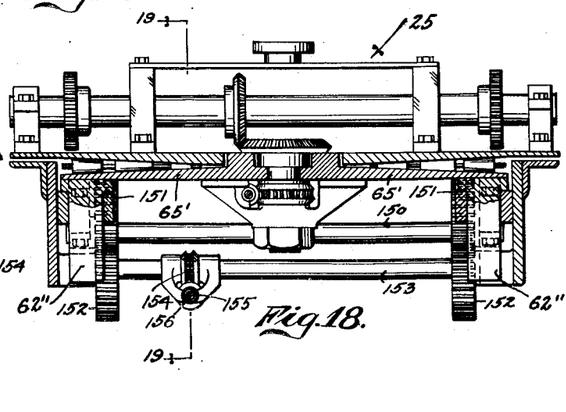
Fig. 18 is an elevational view illustrating the power advancing means with a modified form of vertical adjustment.
Figure 19:
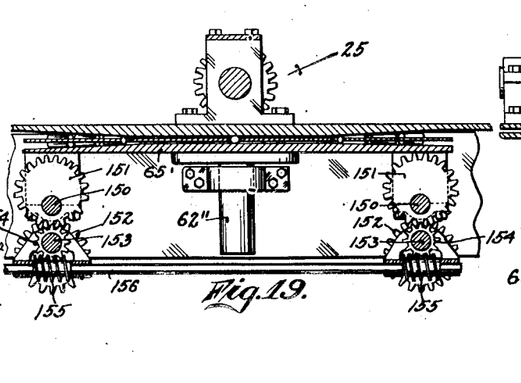
Fig. 19 is a sectional elevation taken substantially in a plane represented by the line 19—19 in Fig. 18.

Figs. 18 and 19 illustrate a modified form of lifting organization for the power advancing unit 25. Instead of using the hydraulic hoist in this organization, the bearing plate 65' is supported by means of a pair of oppositely disposed shafts 150 which in turn are provided with eccentric gears 151, the gears being adapted to engage co-operatively formed and correspondingly eccentric gears 152 which are mounted upon shafts 153 which are supported by the tractor frame. The shafts 153 carry worm wheels 154 which are adapted to be rotated by worms 155 mounted upon a drive shaft 156 which may be rotated from the transmission as was mentioned in connection with the hydraulic hoist and the power advancing unit. In this form of the invention the lower surface of the bearing plate 65' is provided with suitable guide means, generally indicated at 62''.

Figure 20:
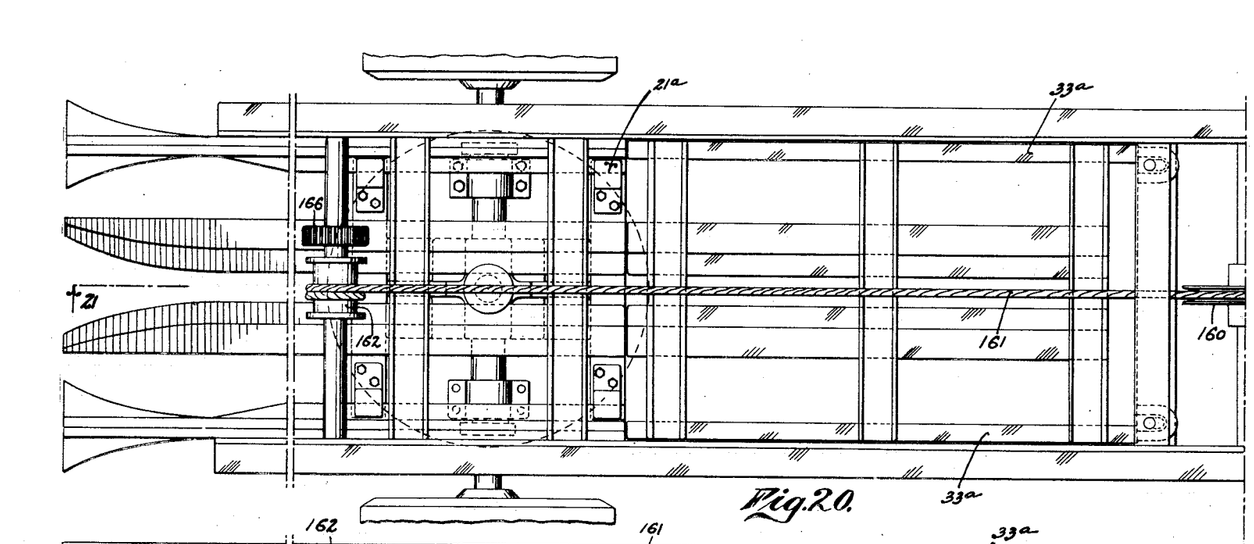
Fig. 20 is a plan view illustrating a trailer provided with a modified form of front wheel retracting organization.
Figure 21:
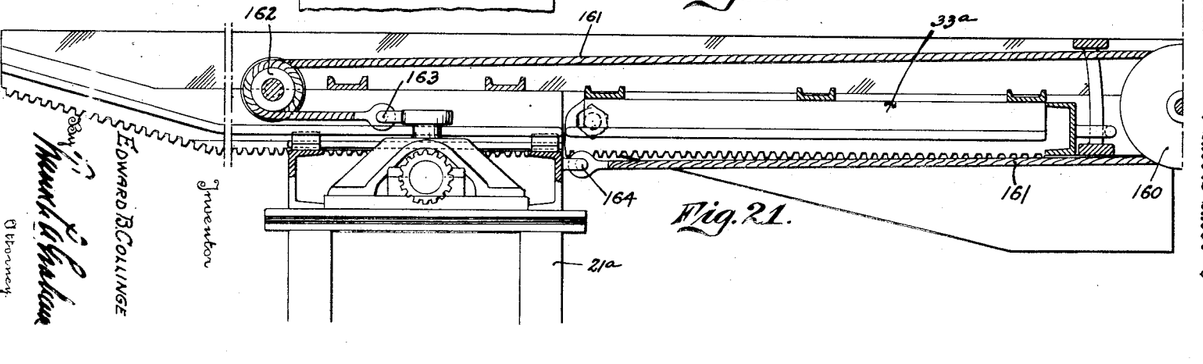
Fig. 21 is a sectional elevation which may be considered as having been taken substantially in a plane represented by the line 21—21 in Fig. 20.

Figs. 20 and 21 illustrate a modified form of trailer in which means are provided for retracting the front wheels independently of any connection between the tractor and the trailer.

In this embodiment of the invention it will be noted that a pulley 160 is mounted on the trailer behind the pivoted rack sections 33a. A cable 161 extends over the pulley 160 and a forward pulley 162 is provided in the trailer ahead of the forward position of the front wheel frame 21a. The cable 161 extends over this pulley and opposite ends of the cable are attached to the trailer frame as indicated at 163 and 164. The pulley 162 may be provided with a power unit such as indicated at 166, this unit being provided with a suitable trip mechanism which operates when the front wheels are disengaged from the lock and the relative movement between the trailer and the tractor is initiated. Such a mechanism (not shown) is effective to start the operation of the pulley 162 and thereby effect a movement of the front wheels in a forward or rearward direction depending on whether the trailer is being retracted from or mounted upon the tractor.

It will be understood from the foregoing description that this invention embodies a tractor and trailer organization which is simple in its construction and which may be employed to carry loads far in excess of those now carried by the units in practical operation. It embodies certain features of novelty which may be used independently; and it will be understood that, while I have herein described one specific embodiment of the invention and indicated various modifications, the invention is not limited to the precise construction set forth but includes within its scope whatever changes fairly come within the spirit of the appended claims.

I claim as my invention:

1. A tractor and semi-trailer organization embodying: a tractor member; a trailer member having front wheels which are movable relative to the rear wheels of said trailer; power means interposed between said tractor member and said trailer member for effecting relative movement between the rear wheels of said trailer and the rear wheels of said tractor; and means for holding the front wheels of said trailer in a substantially fixed position relative to the rear wheels of said tractor during the operation of said power means.

2. A tractor and semi-trailer organization embodying: a tractor member; a trailer member having front and rear wheels; and power means on the rear of said tractor for drawing the front end of said trailer over the rear end of said tractor to a position at which the rear of the tractor carries the weight of the front of the trailer, said means including power driven pinions mounted on said tractor and cooperating racks mounted on said trailer.

3. A tractor and semi-trailer organization embodying: a tractor member; a trailer member having front and rear wheels; power means on the rear of said tractor for drawing the front end of said trailer over the rear end of said tractor to a position at which the rear of the tractor carries the weight of the front of the trailer; and means for effecting relative movement of the front wheels of said trailer toward the rear wheels of said trailer during the advance of the front end of said trailer over the rear end of said tractor.

4. A tractor and semi-trailer organization embodying: a tractor member; a trailer member having front and rear wheels; power means including a power driven pinion on the rear of said tractor and a cooperating rack on said trailer for drawing the front end of said trailer over the rear end of said tractor to a position at which the rear of the said tractor carries the weight of the front of the trailer; and means for locking the front end of said trailer over the rear end of said tractor, said means including a fixed pivot point on said tractor in sliding engagement with the forward end of said trailer.

5. A tractor and semi-trailer organization embodying: a tractor member; a trailer member having front and rear wheels; power means on the rear of said tractor for drawing the front end of said trailer over the rear end of said tractor to a position at which the rear of the tractor carries the weight of the front of the trailer; means for moving the front wheels of said trailer to a retracted position relative to the front end of said trailer; and means for locking the front wheels of said trailer in this retracted position.

6. A tractor and semi-trailer organization embodying: a tractor member; a trailer member having front and rear wheels; power means on the rear of said tractor for drawing the front end of said trailer over the rear end of said tractor to a position at which the rear of the tractor carries the weight of the front of the trailer; means for moving the front wheels of said trailer to a retracted position relative to the front end of said trailer; and means for pivotally supporting said front wheels when in a retracted position so that they are movable in vertical planes relative to the rear wheels of said trailer.

7. A tractor and semi-trailer organization embodying: a tractor member; a trailer member having front and rear wheels; power means on the rear of said tractor for drawing the front end of said trailer over the rear end of said tractor to a position at which the rear of the tractor carries the weight of the front of the trailer; and means for moving the front wheels of said trailer to a retracted position relative to the front end of said trailer; and means for holding the front wheels of said trailer substantially in alignment with the rear wheels thereof while the front wheels are in a retracted position.

8. A tractor and semi-trailer organization embodying: a tractor member; a trailer member having front and rear wheels; power means on the rear of said tractor for drawing the front end of said trailer over the rear end of said tractor to a position at which the rear of the tractor carries the weight of the front of the trailer; and means for moving the front wheels of said trailer to a retracted position relative to the front end of said trailer; and means for holding the front wheels of said trailer substantially in alignment with the rear wheels thereof while the front wheels are in a retracted position; and means for locking the front wheels against movement in a horizontal plane while in a retracted position.

9. A tractor and semi-trailer organization embodying: a tractor member; a trailer member having front and rear wheels; power means on the rear of said tractor for drawing the front end of said trailer over the rear end of said tractor to a position at which the rear of the tractor carries the weight of the front of the trailer; and means for moving the front wheels of said trailer to a retracted position relative to the front end of said trailer; and means for holding the front wheels of said trailer substantially in alignment with the rear wheels thereof, while the front wheels are in a retracted position; means for pivotally supporting said front wheels when in a retracted position so that they are movable in vertical planes relative to the rear wheels of said trailer; and means for locking said front wheels in the retracted position.

10. A tractor and semi-trailer organization embodying: a tractor member; a trailer member having front and rear wheels; forward releasable locking means on said trailer for locking the front wheels of said trailer in a forward position; power means on the rear of said tractor for drawing the front end of said trailer over the rear end of said tractor; means for moving the front wheels of said trailer toward the rear end of said trailer simultaneously with said drawing movement; means on said tractor for engaging the forward locking means on said trailer when said trailer is in an advanced position on said tractor; and locking means rearwardly mounted on said trailer for holding the front wheels of the trailer in a retracted position.

11. A tractor and semi-trailer organization embodying: a tractor member; a trailer member having front and rear wheels; forward releasable locking means on said trailer for locking the front wheels of said trailer in a forward position; power means on the rear of said tractor for drawing the front end of said trailer over the rear end of said tractor; means for moving the front wheels of said trailer toward the rear end of said trailer simultaneously with said drawing movement; means on said tractor for engaging the forward locking means on said trailer when said trailer is in an advanced position on said tractor; and locking means rearwardly mounted on said tractor for holding the front wheels in a retracted position, the forward and rearward locking means on said trailer being connected for co-operative manipulation.

12. A tractor and semi-trailer organization embodying: a tractor member; a trailer member; and power means interposed between said tractor member and said trailer member and operable independently of the movement of said tractor member for effecting relative horizontal movement between said members, said power means being vertically adjustable as a unit relative to said tractor member.

13. A tractor and semi-trailer organization embodying: a tractor member; a trailer member having front and rear wheels; power means, including a power driven pinion gear, on the rear of said tractor for drawing the front end of said trailer over the rear end of said tractor to a position at which the rear of the tractor carries the weight of the front of the trailer; separate means for imparting vertical adjustment to said power means for effecting an initial engagement between said power means and said trailer.

14. A tractor and semi-trailer organization embodying: a tractor member; a trailer member; and power means interposed between said tractor member and said trailer member for effecting relative movement between said members, said power means embodying oppositely disposed trailer supporting members, mounted to rotate about a pivot point on said tractor in a manner to engage said trailer when said trailer is angularly disposed relative to said tractor.

15. A tractor and semi-trailer organization embodying: a tractor member; a trailer member; power means interposed between said tractor member and said trailer member for effecting relative movement between said members, said power means embodying oppositely disposed cylindrical trailer supporting pinions, and means on said tractor for positively driving said pinions; and oppositely disposed rack members on said trailer adapted to be engaged by said pinions, said rack members having initially inclined portions adapted to effect a combined vertical and horizontal movement of said racks when actuated by said pinions.

16. A tractor and semi-trailer organization embodying: a tractor member; a trailer member; power means interposed between said tractor member and said trailer member for effecting relative movement between said members, said power means embodying oppositely disposed cylindrical trailer supporting pinions, and means on said tractor for positively driving said pinions; and oppositely disposed rack members on said trailer adapted to be engaged by said pinions, said rack members being provided with a flared front end and having an initially inclined portion adapted to effect a combined vertical and horizontal movement of said rack when actuated by said pinion.

17. A tractor and semi-trailer organization embodying: a tractor member; a trailer member; power means interposed between said tractor member and said trailer member for effecting relative movement between said members, said power means embodying oppositely disposed cylindrical trailer supporting pinions, and means on said tractor for positively driving said pinions; and oppositely disposed rack members on said trailer adapted to be engaged by said pinions, the front ends of said rack members being sloped upwardly.

18. A tractor and semi-trailer organization embodying: a tractor member; a trailer member; power means interposed between said tractor member and said trailer member and operable independently of the movement of said tractor for effecting relative horizontal movement between said members; a guide member on the rear end of said tractor; and a guide track on said trailer, said guide member comprising a pin fixed on said tractor, adapted to operate in said guide track.

19. A tractor and semi-trailer organization embodying: a tractor member; a trailer member; power means interposed between said tractor member and said trailer member and operable independently of the movement of said tractor for effecting relative horizontal movement between said members; a guide pin on the rear end of said tractor and a guide track on said trailer, the forward end of said guide track being flared to receive said guide pin.

20. A tractor and semi-trailer organization embodying: a tractor member; a trailer member; power means interposed between said tractor member and said trailer member and operable independently of the movement of said tractor for effecting relative horizontal movement between said members; a guide pin on the rear end of said tractor and a guide track on said trailer, the forward end of said guide track being tapered upwardly.

21. A tractor and semi-trailer organization embodying: a tractor member; a trailer member; and power means mounted on said tractor member for effecting relative movement between said members, said power means comprising a transverse shaft rotatably supported by said tractor; trailer advancing means, including pinion gears, mounted on said shaft and means for imparting rotation to said shaft, said advancing means being constructed so as to impart uniform movement to said trailer during a plurality of shaft revolutions.

22. A tractor and semi-trailer organization embodying: a tractor member having driving means; a trailer member; and power means mounted on said tractor member for effecting relative movement between said members, said power means comprising a transverse shaft rotatably supported by said tractor, trailer advancing means mounted on said shaft and means including pinion gears, operated by said tractor driving means for imparting rotation to said shaft.

23. A tractor and semi-trailer organization embodying: a tractor member having driving means; a trailer member; and power means mounted on said tractor member for effecting relative movement between said members, said power means comprising a transverse shaft rotatably supported by said tractor, trailer advancing means mounted on said shaft and means for imparting rotation to said shaft comprising a vertical shaft, co-operating gears interposed between said vertical shaft and said transverse shaft and gear means operable by said tractor driving means for imparting rotation to said vertical shaft.

24. A tractor and semi-tractor organization embodying: a tractor member, a trailer member; and power means mounted on said tractor member for effecting relative movement between said tractor and trailer, said power means comprising a substantially horizontal rotary table, bearings on said rotary table, a transverse shaft rotatably supported by said bearings, trailer advancing means on said transverse shaft, and means for rotating said shaft.

25. A tractor and semi-trailer organization embodying: a tractor member; a trailer member; and power means mounted on said tractor member for effecting relative movement between said tractor and trailer, said power means comprising a substantially horizontal rotary table, bearings on said rotary table, a transverse shaft rotatably supported by said bearings, trailer advancing means on said transverse shaft; means for rotating said shaft and means for imparting vertical adjustment to said table.

26. A tractor and semi-trailer organization embodying: a tractor member, a trailer member; and power means mounted on said tractor member for effecting relative movement between said tractor and trailer, said power means comprising a substantially horizontal rotary table; a bearing plate supporting said rotary table, an adjustable support for said bearing plate, shaft bearings on said rotary table, a transverse shaft in said bearings; trailer advancing means on said shaft and means for rotating said shaft.

27. A tractor and semi-trailer organization embodying: a tractor member; a trailer member; and power means mounted on said tractor member having driving means for effecting relative movement between said tractor and trailer, said power means comprising a substantially horizontal rotary table, a bearing plate supporting said rotary table, a hoist member operable by said tractor driving means for adjustably supporting said rotary table; shaft bearings on said rotary table, a transverse shaft rotatably mounted in said shaft bearings, means for rotating said shaft, and trailer advancing means on said transverse shaft.

28. A tractor and semi-trailer organization embodying: a tractor member; a trailer member; power means mounted on said tractor member for effecting relative movement between said tractor and said trailer, said power means comprising a transverse shaft rotatably mounted on said tractor, means for rotating said shaft, and gears rigidly mounted on said shaft; and rack members on said trailer adapted to engage said gears.

29. A tractor and semi-trailer organization embodying: a tractor member; a trailer member; power means mounted on said tractor member for effecting relative movement between said tractor and said trailer, said power means comprising a transverse shaft rotatably mounted on said tractor, means for rotating said shaft and gears rigidly mounted on said shaft; and rack members on said trailer, the forward ends of said rack members being flared for engagement with said gears.

30. A tractor and semi-trailer organization embodying: a tractor member; a trailer member; power means mounted on said tractor member for effecting relative movement between said tractor and said trailer, said power means comprising a transverse shaft rotatably mounted on said tractor, means for rotating said shaft, and gears rigidly mounted on said shaft; and rack members on said trailer, the forward ends of said rack members being upwardly tapered to effect a lifting movement upon the front end of said trailer during the advance of said racks over said gears.

31. For use in combination with an organization of the class described, a dual locking unit embodying: a pair of vertical pins; a track embodying horizontal guide members spaced apart to receive said pins; and engaging plates pivotally mounted upon said horizontal guide members between said pins, said engaging plates having inner curved edges provided with a plurality of notches adapted to co-operatively surround either one of said pins when it is moved toward said plates and into engagement with the inner surfaces of said notches.

32. For use in combination with an organization of the class described, a dual locking unit embodying: a pair of vertical pins; a track embodying horizontal guide members spaced apart to receive said pins; engaging plates pivotally mounted upon said horizontal guide members between said pins, said engaging plates having inner curved edges provided with a plurality of notches adapted to co-operatively surround either one of said pins when it is moved toward said plates and into engagement with the inner surfaces of said notches; and locking plates adapted to hold the outer edges of said engaging plates in a pin locking position when either one of said pins is enclosed within a set of said notches.

33. For use in combination with an organization of the class described, a dual locking unit embodying: a pair of vertical pins; a track embodying horizontal guide members spaced apart to receive said pins; engaging plates pivotally mounted upon said horizontal guide members between said pins, said engaging plates having inner curved edges provided with a plurality of notches adapted to co-operatively surround either one of said pins when it is moved toward said plates and into engagement with the inner surfaces of said notches; and locking plates adapted to hold the outer edges of said engaging plates in a pin locking position when either one of said pins is enclosed within a set of said notches, said locking plates being pivoted upon horizontal axes above said horizontal guide members and adapted to normally rest upon said engaging plates.

34. For use in combination with an organization of the class described, a dual locking unit embodying: a pair of vertical pins; a track embodying horizontal guide members spaced apart to receive said pins; engaging plates pivotally mounted upon said horizontal guide members between said pins, said engaging plates having inner curved edges provided with notches adapted to co-operatively surround either one of said pins when it is moved toward said plates and into engagement with the inner surfaces of said notches; and locking plates adapted to hold the outer edges of said engaging plates in a pin locking position when either one of said pins is enclosed within a set of said notches, said locking plates being pivoted upon horizontal axes above said horizontal guide members and adapted to normally rest upon said engaging plates; means for rotating said locking plates to a disengaging position relative to said engaging plates.

35. For use in combination with an organization of the class described, a locking unit embodying: a vertical pin; a track embodying horizontal guide members spaced apart to receive said pin; engaging plates pivotally mounted upon said horizontal guide members, said engaging plates having inner curved edges provided with notches adapted to cooperatively surround said pin when said pin is moved toward said plates and into engagement with the inner surfaces of said notches; and a locking plate adapted to hold the outer edges of said engaging plates in a pin locking position when said pin is enclosed within said notches, said locking plate being pivoted upon a horizontal axis above said horizontal guide members and adapted to normally rest upon said engaging plates; means for rotating said locking plate to a disengaging position relative to said engaging plates, said locking plates being provided with a projection engageable by said pin when said locking plate is in a disengaging position and adapted to throw said locking plate into engagement with said engaging plates after the withdrawal of said pin from said engaging plates.

36. A tractor and semi-trailer organization embodying: a tractor member; a trailer member having a frame; and power means including rotatable gears carried by said tractor for effecting relative movement between said tractor and said trailer, said trailer member embodying a rear wheel frame mounted in fixed relation to said trailer frame, a front wheel frame movable relative to said trailer frame, rack means on the underside of said trailer frame adapted to engage said power gears, and gears on said front wheel frame adapted to engage said rack means.

37. A tractor and semi-trailer organization embodying: a tractor member; a trailer member having a frame; and power means including rotatable gears carried by said tractor for effecting relative movement between said tractor and said trailer, said trailer member embodying a rear wheel frame mounted in fixed relation to said trailer frame, a front wheel frame movable relative to said trailer frame, rack means on the under side of said trailer frame adapted to engage said power gears; gears on said front wheel frame adapted to engage said rack means; and guide means on said front wheel frame adapted to prevent disengagement between the rack and the gears carried by said front wheel frame.

38. A tractor and semi-trailer organization embodying: a tractor member; a trailer member having front wheels which are movable relative to the rear wheels of said trailer; power means on said tractor member for effecting relative movement between said tractor and said trailer; and a tongue connecting the front wheels of said trailer to the rear end of said tractor to hold said front wheels in a fixed position relative to said tractor while said relative movement is taking place between said tractor and trailer.

39. A trailer for use in combination with a tractor embodying: a trailer frame; a rear wheel supporting structure; a front wheel supporting structure horizontally movable relative to said rear wheel supporting structure; and locking means for securing said front wheel supporting structure in forward and rearward positions, said front wheel supporting structure being swingable in a vertical plane when locked in a rearward position.

40. A trailer for use in combination with a tractor embodying: a trailer frame; a rear wheel supporting structure; a front wheel supporting structure movable relative to said rear wheel supporting structure; locking means for securing said front wheel supporting structure in forward and rearward positions, said trailer frame being provided with racks; pinions on said front wheel supporting structure adapted to engage said racks; and means operable to drive said pinions by the power from said tractor.

41. A trailer for use in combination with a tractor embodying: a trailer frame; a rear wheel supporting structure; a front wheel supporting structure movable relative to said rear wheel supporting structure; locking means for securing said front wheel supporting structure in forward and rearward positions, said trailer frame being provided with a pair of fixed racks having a rearward pair of racks pivotally joined thereto, the rear racks being pivoted to swing in vertical planes; and pinions on said front wheel supporting structure adapted to engage said racks.

42. A trailer for use in combination with a tractor embodying; a trailer frame; a rear wheel supporting structure; a front wheel supporting structure movable relative to said rear wheel supporting structure; locking means for securing said front wheel supporting structure in forward and rearward positions, said trailer frame being provided with a pair of fixed racks having a rearward pair of racks pivotally joined thereto, the rear racks being pivoted to swing in vertical planes; pinions on said front wheel supporting structure adapted to engage said racks, and downwardly extending plate members on opposite sides of said trailer frame adapted to receive said front wheel supporting structure therebetween.

In testimony whereof, I have hereunto set my hand at Los Angeles, California, this 31st day of October, 1928.

EDWARD B. COLLINGE.